United States Patent
Ishizaki et al.

(10) Patent No.: US 6,475,935 B1
(45) Date of Patent: Nov. 5, 2002

(54) REGENERATOR AND REGENERATIVE MATERIAL USED THEREIN

(75) Inventors: Yoshihiro Ishizaki, Kamakura (JP); Yuzo Hayashi, Kawagoe (JP)

(73) Assignees: Irie Kouken Co., LTD, Tokyo (JP); ECTI, Kanagawa (JP)

( * ) Notice: Subject to any disclaimer, the term of this patent is extended or adjusted under 35 U.S.C. 154(b) by 0 days.

(21) Appl. No.: 09/550,859

(22) Filed: Apr. 17, 2000

(30) Foreign Application Priority Data

Jul. 9, 1999 (JP) .......................................... 11-196561

(51) Int. Cl.⁷ .......................... D03D 15/00; B32B 5/08; B32B 27/02
(52) U.S. Cl. ...................... 442/188; 442/187; 442/209; 442/218; 442/219; 442/220; 442/229; 442/189; 442/210; 442/239
(58) Field of Search ............................... 442/187, 188, 442/209, 229, 301, 302, 218, 219, 220, 189, 210, 239

(56) References Cited

U.S. PATENT DOCUMENTS 5,433,998 A * 7/1995 Curzio et al. ................ 428/260

\* cited by examiner

*Primary Examiner*—Cheryl A. Juska
*Assistant Examiner*—Christopher C. Pratt
(74) *Attorney, Agent, or Firm*—Ladas & Parry

(57) ABSTRACT

The present invention provides a regenerator which has uniform performance and extremely high productivity and can keep performance and reliability as a regenerator, as well as a regenerative material used in the regenerator, in order to solve technical problems in mass production. A mat type regenerative material is woven into a cloth shape by using flexible and very long fine wires (C1, C2) made of one or a plurality of heat storage materials having a high specific heat per unit volume in the operating temperature range, for longitudinal wire members (C1, C2); and fine wires (D3) comprising a core wire consisting either of a single filament (D1) of at least one of ceramic fiber, carbon fiber, and synthetic resin fiber which have a higher hardness than that of the longitudinal wire members, a proper elasticity, and an extremely low heat conductivity, or of a filament composite (D2) formed by bundling a number of the same filaments as the single filament into one body with a fixing agent such as synthetic resin or glass, and a polymeric synthetic resin covering the core wire, for transverse wire members (D3).

13 Claims, 3 Drawing Sheets

(a)  (b)  (c)

(a)

(b)

(a)

(b)

REGENERATOR AND REGENERATIVE MATERIAL USED THEREIN

BACKGROUND OF THE INVENTION

1. Field of the Invention

The present invention relates to a construction of a regenerator and a regenerative material, which are used as principal components of a regenerative cycle cryocooler (Solvay, Duilleumier, Stirling, Gifford-MacMahon and Pulse tube type) for generating low temperatures in the region between 273K and 2K.

2. Prior Art

The regenerative material for a refrigerator for generating absolute temperatures in the region between 273K and 2K is an essential component for determining the performance of the refrigerator.

Conventionally, in order to manufacture such a regenerative material, a wire net (100 to 500 mesh) of a metal such as copper, bronze or stainless steel, having a high specific heat per unit volume in the operating temperature range is blanked out into a circular shape, and several hundreds of the circular wire nets are packed and laminated in a pipe and used as a regenerative material (hereinafter referred to as a mesh type regenerative material). Alternatively, a regenerative material has been well known which is manufactured by packing innumerable and small (not larger than 0.4 mm in diameter) lead balls, or small balls or fragments of $Er_3Ni$ or the like which has a high magnetic specific heat at low temperatures (hereinafter referred to as a small ball type regenerative material).

As described above, the conventional regenerative material is of a mesh type in which several hundreds of circular meshes are laminated, or is of a small ball type in which innumerable and small balls are charged. In the mesh type, however when the meshes are laminated, they are stacked one after another to form a laminate. Therefore, very much time is required to form the laminate by manual operation or machine working using a jig, so that productivity of the laminate is extremely poor.

Also, in the mesh type, since hundreds of meshes are laminated at random, there is a high probability that minute and square fluid path areas of the meshes are blocked up by each other. Therefore, the fluid resistance of working fluid is very high, and thereby, the frictional loss of fluid increases significantly.

Further, in the mesh type, the wire net is mechanically blanked out into a circular form. At this time, shortened fine wires at the circumferential edge of the circular wire net drop out of the net. Therefore, when a regenerator is manufactured by laminating several hundreds of wire nets, the working fluid flows in a large amount through the circumferential edge portion of wire nets, where the fluid resistance is low, resulting in decreased efficiency.

That is, when a regenerator is manufactured by laminating the wire nets in a cylinder, the fluid does not flow at the same velocity in any cross section in the cylinder. The fluid flows in large quantities near the inside wall of the cylinder, which is the circumferential edge of the wire nets, and the flow at the central portion decreases, so that the total heat capacity of wire nets cannot be effectively used, whereby the increase in efficiency is limited.

Also, from the viewpoint of flow resistance and effective use of mesh, there arises a problem that the individual regenerator has different performance if it is manufactured in mass-production. Further, there is a possibility that the shortened fine wires at the circumferential edge are mechanically vibrated by the contact with the high-velocity fluid, and the vibration propagates in the fluid and causes noise at a sensor in a cold head section. On the other hand, the small ball type presents problems that the small ball is crushed and pulverized by mechanical vibration caused by reciprocating motion of a displacer or expansion piston and by a shock wave caused by sudden speed change of fluid, whereby not only the performance of a regenerator is deteriorated but also the pulverized ball intrudes into other components to close the flow path of fluid, causing a system trouble.

SUMMARY OF THE INVENTION

The present invention has been made to solve the above problems, and accordingly an object of the present invention is to provide a regenerator having uniform and maintained performance, extremely high productivity and maintained and reliability, and a regenerative material used for the accumulator, so that technical problems in mass production are solved.

In the present invention, the above problems are solved by a mat type regenerative material which is woven into a cloth shape by using: flexible and very long fine wires for longitudinal wire members made of one or a plural kinds of heat storage material having a high specific heat per unit volume in the operating temperature range; and fine wires for transverse wire members each of which comprises a core wire consisting either of a single filament made of at least one kind of ceramic fiber, carbon fiber and synthetic resin fiber having a higher hardness than that of the longitudinal wire member, an appropriate elasticity, and an extremely low heat conductivity, or of a filament composite formed by bundling a number of the single filaments into one body with a fixing agent such as synthetic resin or glass, and polymeric synthetic resin covering the core wire.

Also, the above problems are solved by a mat type regenerative material formed by weaving longitudinal wire members continuously in the lengthwise direction into a cloth shape with transverse wire members as woofs, wherein a transverse wire member is a first fine wire comprising a core wire consisting either of a single filament made of ceramic fiber selected from TYRANO fiber, boron fiber, and zirconia fiber which have an extremely lower heat conductivity than that of the longitudinal wire members, predetermined hardness and elasticity carbon fiber, or other synthetic resin fiber having hardness at least higher than that of the longitudinal wire members or of a filament composite formed by bundling a plurality of the above mentioned single filaments into one body with a fixing agent such as synthetic resin or glass, and a polymeric synthetic resin such as polyimide, polyamide and polyethylene covering outer periphery of the single filament or the filament composite; and a longitudinal wire member is a second fine wire comprising a core wire made of copper, nickel, iron, aluminum, or an alloy thereof having a high specific heat per unit volume in the operating temperature range, whose outer peripheral surface is plated with neodymium, lead or lead alloy and/or covered with fine powder of a material having a high magnetic specific heat, by bonding, joining or coating.

Also, the above problems are solved by a regenerative material characterized in which the diameter (d3) of the transverse wire members is 0.06 to 0.5 mm, and a distance (L1) between the transverse wire members is three to ten times of the diameter of the transverse wire members in order to make the flow resistance of fluid lower than a predetermined value; or the diameter of the transverse wire members (d3) is 0.06 to 0.08 mm, and a third very fine wire members are woven in along the lengthwise direction of the transverse wire member around the longitudinal wire members as cores in order to fix the adjacent longitudinal wire members at a position between the adjacent transverse wire members.

Also, the above problems are solved by a regenerative material in which by heating and compressing the plane of the regenerative material woven into a cloth shape, the polymeric synthetic resin applied to the transverse wire members is deformed along the contact surface with the longitudinal wire members, whereby the longitudinal wire members are fixed and supported on the transverse wire members, and further the aforementioned material having a high magnetic specific heat is formed of at least one kind of material selected from neodymium, $DyNi_2$, $Er_3Ni$, $Er_6Ni_2Sn$, and $ErNi_{0.9}Co_{0.1}$.

Also, the above problems are solved by a regenerator having a construction in which the mat type regenerative material woven into a cloth shape is wound up around a Teflon rod having an extremely low heat conductivity or around a pulse tube of a pulse tube refrigerator to form a regenerator core, and the regenerator core is inserted in a cylindrical member, whereby a working fluid is caused to flow along the lengthwise direction of the transverse wire members.

BEST MODE FOR CARRYING OUT THE INVENTION

Figure 1:
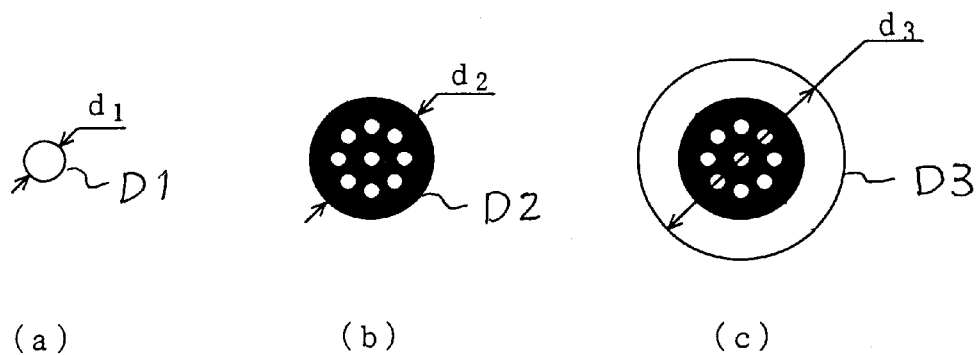
FIG. 1 is a view showing a state of a transverse wire member, which is a first fine wire in accordance with the present invention.

As described above, the present invention relates to a construction of a regenerator and a regenerative material, which are used as principal components of a regenerative refrigerating cycle, such as Solvay, Duilleumier, Stirling, Gifford-MacMahon and Pulse tube or the like, for generating low temperatures in the region between 273K and 2K.

The requirements for the regenerative material and the regenerator in the present invention from the side of refrigerating cycle include 1) high energy efficiency, 2) low resistance loss of fluid reciprocating in the regenerator, 3) high heat capacity per unit volume and large heat transfer area, 4) low loss of heat conductivity from normal temperature to low temperature, 5) no deterioration in performance with the passage of time, 6) no individual difference in performance, and 7) easy and inexpensive manufacture of the regenerator. Among these, items 2), 4), 6) and 7) were especially considered to be important.

The present invention operates as described below. The regenerative material comprises first fine wires, which have a very low heat conductivity and a high hardness, form flow paths for a fluid, and constitute a plurality of transverse wire members for forming a mat shaped construction, second fine wires, which constitute very long longitudinal wire members having a high specific heat in the operating temperature range to store cold heat, and third fine wires, which continuously tie the second fine wires one by one to prevent metal contact between the second fine wires and to prevent the mat shape from being broken up even in the case where the mat shape is cut longitudinally or transversely.

Also, since the second fine wires are tied continuously one by one and the second fine wires are so constructed as to prevent metal contact with each other, each of the second fine wires easily maintains its own temperature. When the regenerator is manufactured by packing such mat type regenerative material, the regenerative material is wound up into a roll-shaped to form a regenerator core, and the roll-shaped or a multiple spiral shaped regenerator core is inserted into a pipe, so as to obtain the regenerator with uniform performance.

Also, the regenerator manufactured by winding the regenerative material on a core into a roll shape or a multiple spiral shape to make a regenerator core and by inserting the regenerator core into a pipe can be easily mass-produced. Since the regenerative material in accordance with the present invention is configured as described above, the obtained regenerator is low in cost and very high in productivity.

The aforementioned wire members of fine wires comprise transverse wire members, which are a plurality of the first fine wires arranged substantially in parallel with a first direction, and longitudinal wire members, which are a plurality of the second fine wires arranged substantially perpendicularly to the transverse wire members of the first fine wires. The longitudinal wire members are preferably braided with the third fine wires for fixing to prevent direct contact between adjacent longitudinal wire members at a position of intersection between the adjacent transverse wire members.

Here, a mat shape means a shape such as a planar sheet which can be wound into a roll shape, or wound on a core or a pulse tube of a pulse tube refrigerator to form a regenerator integral with the pulse tube.

Embodiments

Figure 2:
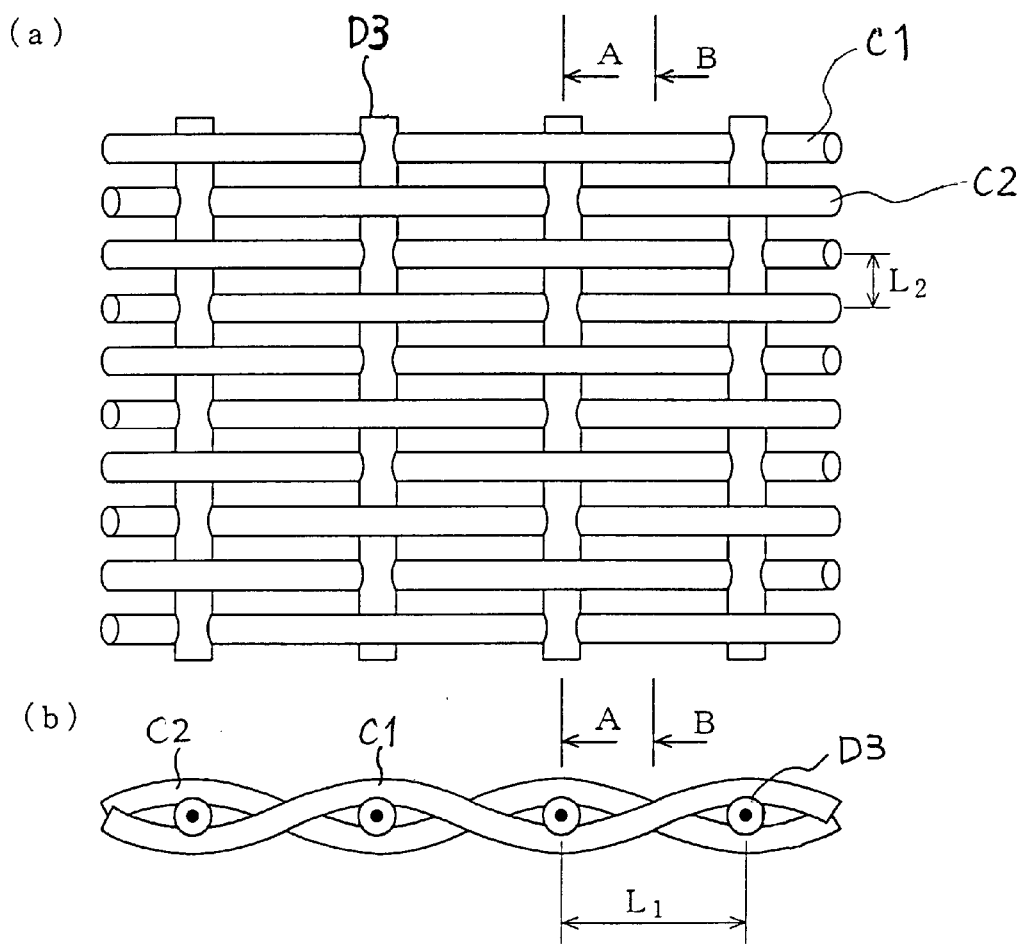
FIG. 2 is a schematic view showing a part of a mat type regenerative material in accordance with the present invention, FIG. 2(a) being a view showing the state of the surface side of the mat type regenerative material, and FIG. 2(b) being a view taken from the section side of the transverse wire members in the mat type regenerative material.

An image of the shape of the regenerative material in accordance with the present invention is shown in FIGS. 1 and 2.

A first fine wire for a transverse wire member comprises: a core wire consisting either of a single filament made of ceramic fiber selected from TYRANO fiber, boron fiber, and zirconia fiber, which have an extremely lower heat conductivity than that of a longitudinal wire member described later and have predetermined hardness and elasticity, carbon fiber or synthetic resin fiber having hardness at least higher than that of the longitudinal wire member, or of a filament composite formed by bundling a plurality of the above mentioned single filament into one body with a fixing agent such as synthetic resin or glass; and polymeric synthetic resin covering the outer peripheral surface of the core wire.

Namely, the outer periphery of the hard core wire is covered with a polymeric synthetic resin capable of being deformed by heat. The sectional construction of the first fine wire for the transverse wire member is simple and substantially circular as shown FIG. 1. FIG. 1(a) shows a section of a single filament (D1) with a diameter d1 of about 0.02 to 0.08 mm. FIG. 1(a) shows a section of a filament composite (D2) and FIG. 1(c) shows a section of the filament composite covered with polymeric synthetic resin (D3) whose diameter d3 is about 0.06 to 0.5 mm, preferably about 0.06 to 0.08 mm from the viewpoint of flow resistance and productivity. Polyimide, polyamide, polyester etc. are used for the polymeric synthetic resin. The thickness of the polymeric synthetic resin covering the outer periphery is preferably 20 to 50 $\mu$m.

A second fine wire for a longitudinal wire member (C1, C2) comprises: a core wire made of copper, nickel, iron, aluminum, or an alloy of these metals, which has a high specific heat per unit volume in the operating temperature range. The outer peripheral surface of the core wire is plated with neodymium, lead, or lead alloy and/or covered with fine powder of a material having a high magnetic specific heat by bonding, joining or coating. It has been found that the diameter of the core wire is about 0.02 to 0.5 mm, preferably about 0.02 to 0.08 mm from the viewpoint of formation of the wire considering the efficiency of heat exchange and production.

Usually, bronze or stainless steel (e.g., SUS316) is preferably used for the core wire. The plating thickness of lead or lead alloy on the surface of the core wire is not necessarily great, being sufficiently a few microns to dozens of microns. One feature of the present invention is that fine powder of a material having a high magnetic specific heat, such as $DyNi_2$, $Er_3Ni$, $Er_6Ni_2Sn$, and $ErNi_{0.9}Co_{0.1}$, is applied by bonding, joining or coating on the plating additionally or in place of the plating by bonding, joining, or coating.

In particular, in the temperature region of 20K, a solid wire in which copper wire is used as the core wire and is plated with neodymium, lead, etc.; a solid wire in which copper wire is used as the core wire, plated with neodymium, lead, etc., and further covered with the above mentioned fine powder; or a stranded wire consisting of a plurality of these solid wires are used. In a relatively high temperature region, copper alloy or nickel alloy is used for the core wire.

Such longitudinal wire members are woven continuously in the lengthwise direction into a cloth shape with the aforementioned transverse wire members as woof. In FIG. 2, D3 denotes the transverse wire members in accordance with the present invention, and C1 and C2 denote the longitudinal wire members. A distance L1 between the adjacent transverse wire members and a distance L2 between the adjacent longitudinal wire members are so determined that the flow resistance of working fluid is low and the efficiency of heat exchange by the longitudinal wire members is most effective. The result of experiment indicates that the proper distance (L1) between the transverse wire members is about three to ten times of the diameter (d3) of the transverse wire members, and the proper distance (L2) between the longitudinal wire members is about two to five times of the diameter (c1, c2) of the longitudinal wire members (C1, C2).

As an embodiment, a mat type regenerative material was laminated in a spiral shape with a distance L3 of about 0.1 mm between the adjacent laminated layers. In this regenerative material, the diameter d1 of the single filament constituting the core wire of the transverse wire member was 0.03 mm, the diameter d3 of the wire member covered with a polymeric synthetic resin was 0.05 mm, the distance L1 between the transverse wire members was 0.18 mm, the diameter c1, c2 of the longitudinal wire members (stainless steel wires) was 0.03 mm, and the distance L2 between the adjacent longitudinal wire members was 0.06 mm. The performance thereof was compared with that of the W: conventional regenerative material of stainless steel of 300 mesh. The result of experiment revealed that the mat type regenerative material of the present invention had nearly the same efficiency of heat exchange as that of the conventional regenerative material of 300 mesh, and the former had a flow resistance about 20% lower than that of the latter: thus, a satisfactory result was obtained.

Figure 3:
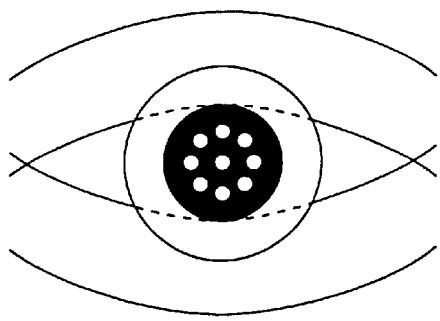
FIG. 3 is an explanatory view showing a state in which a longitudinal wire member in accordance with the present invention shown in FIG. 2 cuts into a transverse wire member, FIG. 3(a) being a view taken from the section side of the transverse wire member, and FIG. 3(b) being a perspective view.
Figure 3:
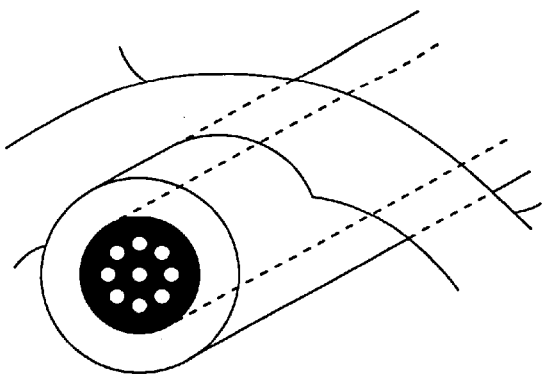

According to the present invention, contact portions on the polymeric synthetic resin portion of the transverse wire members with the longitudinal wire members are deformed along the contact surfaces of the longitudinal wires members by heating the regenerative material and compressing the mat-shaped structure from the plane side (see FIGS. 3(a) and 3(b)), thereby the position of the longitudinal wire members are fixed. That is, it is found that the transverse wire members (diameter d3), which are the first fine wires, and the longitudinal wire members (c1, c2), which are the second fine wires, are fused with each other at the contact portion thereof and are assembled to each other.

Figure 4:
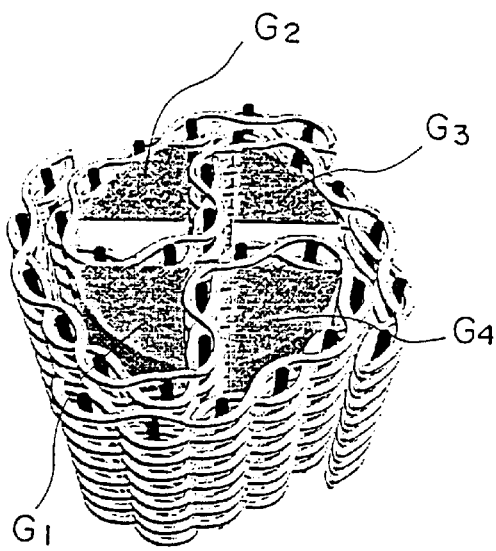
FIG. 4 is a schematic view showing one example of a regenerator in accordance with the present invention, FIG. 4(a) being a perspective view, and FIG. 4(b) being a view taken from the section side of the transverse wire members used therein.
Figure 4:
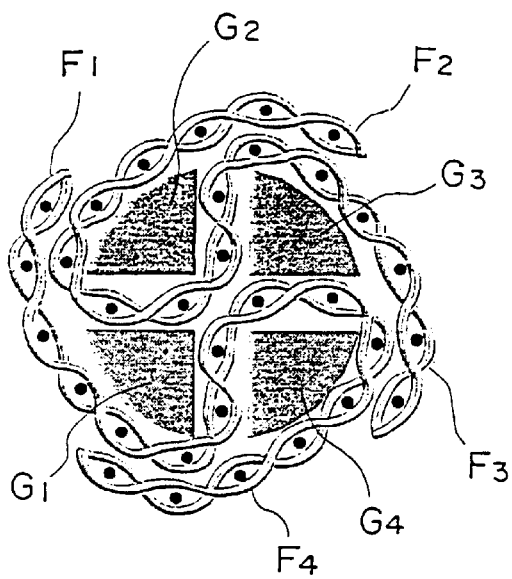

Referring now to FIG. 4, regenerative materials F1 to F4 each woven into a mat shape are wound around a core (divided into four in the figure) G1 to G4 made of a material having an extremely low heat conductivity such as Teflon. This is inserted into a cylinder to form a regenerator.

Figure 5:
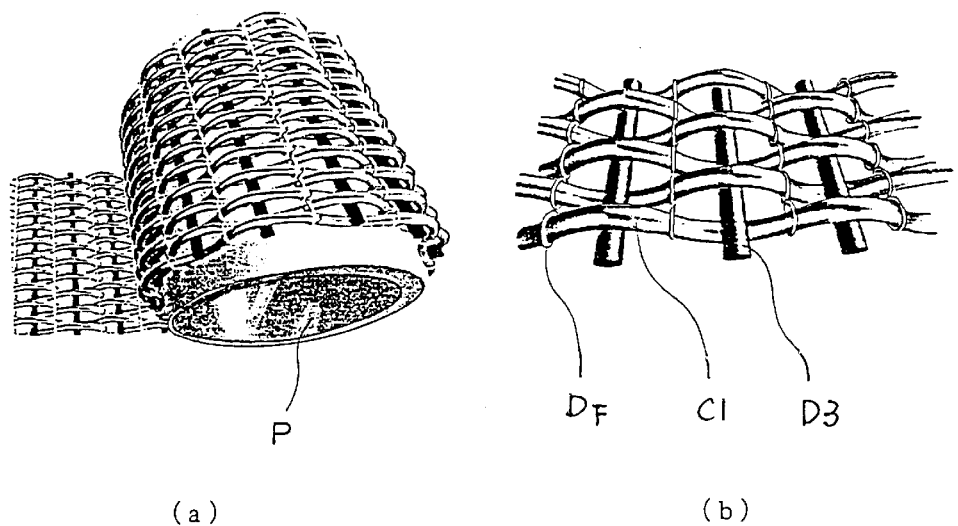
FIG. 5 is a schematic view showing another example of a regenerator in accordance with the present invention, FIG. 5(a) being a perspective view, and FIG. 5(b) being a partially enlarged view of a mat type regenerative material used therein.

FIG. 5 shows another example of the regenerative material in which a third fine wire (Kevlar, nylon, etc.) ($D_F$) is used to tie the longitudinal wire members (C1, C2) at the middle of the adjacent transverse wire members, in order to prevent the longitudinal wire members from coming into contact with each other and also in order to prevent the regenerative material from being broken up even in the case where the regenerative material is cut at an arbitrary position. This is one of the features of the present invention.

As described above, the core wire of the transverse wire member is a single filament of ceramic fiber, such as TYRANO fiber, boron fiber and zirconia fiber, made of an extremely low heat conductive material such as Si, C, Ti, and Zi, or a filament composite formed by bundling many such filaments into one body with a fixing agent such as synthetic resin and glass. Alternatively, for the core wire, a single wire comprising a plurality of filaments and whiskers combined into one may be used to control the diameter and elasticity. The transverse wire members have considerably high hardness, so that even if the mat type regenerative material is wound under compression, the transverse wire members are not caused, and the flow path for the working fluid can sufficiently maintained as a result.

The diameter (d3) of the transverse wire members is 0.06 to 0.5 mm, and this wire member corresponds to the warp in cloth. The diameter (c1, c2) of the longitudinal wire members (C1, C2) is nearly the same as the diameter of the transverse wire members for the temperature down to about 60K. For the temperature lower than this value, however, the longitudinal wire members covered with fine powder of the aforementioned material having a high magnetic specific heat by bonding, joining or coating is used, so that the diameter somewhat differs.

Although not shown in FIG. 4, in the temperature range of normal temperature to 30K, bronze or stainless steel, which has a high specific heat per volume in this range, is preferably used. In the temperature range of 30k and lower, Pb, $D_yNi_2$, ErNi, etc., which has a higher specific heat than other materials in this temperature range, is preferably used.

The third fine wire is a fine wire of Kevlar fiber, silk yarn, TYRANO fiber, etc. with a diameter $d_F$ of a few microns to 0.06 mm. Bonding/binding agent may be used in place of the third fine wire. For example, the fine wires of the longitudinal wire members are tied alternately one by one to prevent metal contact with each other at the intermediate position of the distance L1 where the longitudinal wire members intersect the transverse wire members (see FIG. 5(b)). Assuming that the diameter $d_F$ of the third fine wire is 0.01 mm, the longitudinal wire members are tied so that a distance L3 between the wires is kept 0.02 to 0.04 mm.

For example, in the cross section of B—B of FIG. 2(a), assuming that the temperature ranges from normal temperature to 77.3K, since the metal wires of the longitudinal wire members are not brought into direct contact with each other unlike the mesh type, and moreover the longitudinal wire members are indirectly connected while maintaining the distance L2 by the third fine wires made of materials having an extremely low heat conductivity, fine wires of the longitudinal wire members have respective temperatures ranging from normal temperature to the low temperature so that a certain temperature gradient is easily maintained. Therefore, a solid heat conduction loss from normal temperature to the low temperature caused by the metal is almost zero.

To fix the longitudinal wire members C1, C2 at a position where the longitudinal wire members alternately shift with respect to the transverse wire members without contact with each other, not only the longitudinal wire members in the cross section B—B but also the longitudinal wire members including the transverse wire members in the cross section of A—A of FIG. 2(a) may be tied and fixed by the third fine wires. Alternatively, these wire members may be tied in combination.

FIG. 5 shows the mat type regenerative material, FIG. 5(a) being a perspective view and FIG. 5(b) being an enlarged view of a part of the material. FIG. 5(a) shows a process of constructing a regenerator, in which one end of the mat type regenerative material in accordance with the present invention is fixed in a slit of a core P (a core with a diameter of 4 mm made of, for example, Teflon or ceramics having an extremely low heat conductivity and a proper hardness) for the regenerator, and the regenerative material is wound up into a roll shape to configure the regenerator. By winding the regenerative material up to a predetermined diameter and by inserting it into a pipe, the regenerator in accordance with the present invention can be manufactured.

Figure 6:
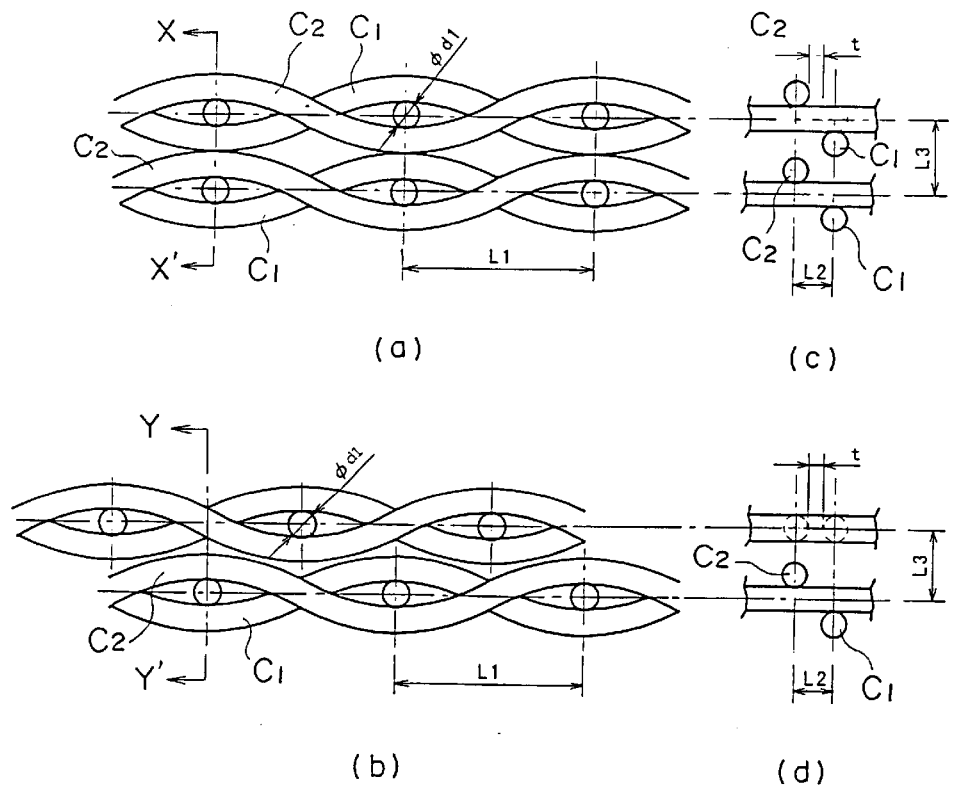
FIG. 6 is an explanatory view showing a relationship between the transverse wire members and the longitudinal wire members in a case where the regenerative materials are stacked, FIG. 6(a) being a view showing a case in which the transverse wire members are arranged in one row, FIG. 6(b) being a view showing a case in which the transverse wire members are arranged in a zigzag form, FIG. 6(c) being a sectional view taken along the line X—X' of FIG. 6(a), and FIG. 6(d) being a sectional view taken along the line Y—Y' of FIG. 6(b).

FIGS. 6(a) and 6(b) are enlarged sectional views of a part of a pile of the regenerative material viewed from the axial direction of the transverse wire members. When the regenerative material is wound in a multiple form or in a multiple spiral form, a matrix shown in FIG. 6(a) or FIG. 6(b) is formed, whereby a space area between wires forms a flow path of the working fluid. The configuration shown in FIG. 6(a) is much preferable because of larger flow path area.

The working fluid (mainly helium, hydrogen, nitrogen, etc.) flows through innumerable space areas to carry out heat exchange and heat transfer at each of the longitudinal wire members C1, C2.

In the above description, the core wires for the mat type regenerative material in accordance with the present invention have a substantially circular cross section. However, the shape of the core wire is not limited to this, and the cross sectional shape of the core wire may be an elliptical shape, a flat oval shape, a rectangular shape with round corners, or the like.

As described above, the regenerative material and the regenerator in accordance with the present invention, which are used for a refrigerator generating absolute temperatures in the region between 273K and 2K, have a low flow resistance of working fluid and extremely high efficiency of heat exchange, and achieve an excellent effect in terms of productivity and economical efficiency as compared with the conventional products.

We claim:

1. A woven mat for a regenerator comprising:
    a) a plurality of warp fibers each of which comprises a core wire having an outer peripheral surface and a covering on the surface, said core wire being made of copper, nickel, iron, aluminum or an alloy thereof, the surface covering comprising (i) neodymium, lead or lead alloy plated to the core wire, (ii) fine powder of neodymium, $DyNi_2$, $Er_3Ni$, $Er_6Ni_2Sn$, or $ErNi_{0.9}Co_{0.1}$ bonded to, joined to, or coated on the core wire, or (iii) both; and
    b) a plurality of weft fibers each of which comprises a core and a polymeric synthetic resin covering a peripheral surface of the core, said core consisting of either (i) a single filament made of a core fiber selected from the group consisting of a ceramic fiber, a carbon fiber and a synthetic resin fiber, or (ii) a filament composite comprising a plurality of said single filaments and fixing means for fixing the plurality of the single filaments in the filament composite; said plurality of weft fibers and said plurality of warp fibers being woven together to form said woven mat.

2. The woven mat according to claim 1, wherein the core fiber is a ceramic fiber selected from the group consisting of boron fiber and zirconia fiber.

3. The woven mat according to claim 1, wherein the fixing means comprises a synthetic resin or glass.

4. The woven mat according to claim 1, wherein the polymeric synthetic resin comprises a polyimide, a polyamide or polyethylene.

5. The woven mat according to claim 1, wherein the core fiber has a hardness that is higher than that of the warp fibers.

6. The woven mat according to claim 1, wherein the core fiber has a heat conductivity that is lower than that of the warp fibers.

7. The woven mat according to claim 1, wherein each of said weft fibers has a diameter of 0.06 to 0.5 mm, and a distance between the weft fibers is three to ten times the diameter of the weft fibers.

8. The woven mat according to claim 1, wherein each of said weft fibers has a diameter of 0.06 to 0.08 mm.

9. The woven mat according to claim 1, wherein each of said warp fibers has a diameter of 0.02 to 0.5 mm, and a distance between the warp fibers is two to five times the diameter of the warp fibers.

10. The woven mat according to claim 1, wherein each of the warp fibers has a diameter of 0.02 to 0.08 mm.

11. The woven mat according to claim 1, comprising a plurality of third fibers each of which is woven along a lengthwise direction of the weft fibers and around a warp fiber so as to provide a means to fix adjacent of the warp fibers at a position between adjacent of the weft fibers.

12. The woven mat according to claim 1, wherein the polymeric synthetic resin of each of the weft fibers is in contact with and deformed by heat compression against one of the warp fibers whereby the warp fibers are fixed and supported on the weft fibers.

13. An article comprising a plurality of the woven mats of claim 1 stacked atop one another.

\* \* \* \* \*